United States Patent
Ebata et al.

(10) Patent No.: US 8,027,275 B2
(45) Date of Patent: Sep. 27, 2011

(54) ROUTE SELECTION IN A COMMUNICATIONS NETWORK USING COMBINED VALUES OF METRICS OF DIFFERENT CHARACTERISTICS

(75) Inventors: Koichi Ebata, Tokyo (JP); Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1156 days.

(21) Appl. No.: 10/392,174

(22) Filed: Mar. 20, 2003

(65) Prior Publication Data

US 2003/0179718 A1 Sep. 25, 2003

(30) Foreign Application Priority Data

Mar. 20, 2002 (JP) ................................. 2002-077446

(51) Int. Cl.
*H04L 12/28* (2006.01)
(52) U.S. Cl. .......................... 370/255; 370/248; 370/250
(58) Field of Classification Search .................. 370/235, 370/238, 248, 250, 255; 709/238, 241, 249
See application file for complete search history.

(56) References Cited

U.S. PATENT DOCUMENTS

| | | | | |
|---|---|---|---|---|
| 6,292,832 B1 * | 9/2001 | Shah et al. | ..................... | 709/226 |
| 6,711,159 B1 * | 3/2004 | Grabelsky et al. | ............. | 370/353 |
| 6,795,860 B1 * | 9/2004 | Shah | .............................. | 709/229 |
| 6,856,592 B2 * | 2/2005 | Grover et al. | .................. | 370/216 |
| 7,002,917 B1 * | 2/2006 | Saleh | ............................... | 370/238 |
| 7,072,304 B2 * | 7/2006 | Ng et al. | ........................ | 370/238 |
| 7,158,486 B2 * | 1/2007 | Rhodes | .......................... | 370/256 |
| 7,233,574 B2 * | 6/2007 | Worfolk et al. | ................ | 370/238 |
| 2002/0024935 A1 * | 2/2002 | Furukawa et al. | ............ | 370/238 |
| 2003/0128687 A1 * | 7/2003 | Worfolk et al. | ................ | 370/351 |
| 2003/0128710 A1 * | 7/2003 | Fedyk et al. | .................. | 370/400 |

* cited by examiner

*Primary Examiner* — Dang Ton
*Assistant Examiner* — Brian O Connor
(74) *Attorney, Agent, or Firm* — Young & Thompson

(57) ABSTRACT

A control packet is broadcast over a route, containing first and second metric values of different transmission characteristics of the route. At a local node, control packets from multiple nodes are received and examined for their source. If the packets are received from upstream nodes, the metrics of the received packets are updated, the second metric is weighted and summed with the first metric to produce a number of combined metrics and a minimum value of the combined metrics is detected. One of the routes having the detected value is selected as a route to an upstream node. If the control packets are received from downstream nodes, the second metric is weighted and summed with the first metric to produce a number of combined metrics and a smaller values of combined metrics are detected corresponding in number to usable antennas and routes of the detected values are selected.

18 Claims, 6 Drawing Sheets

ROUTE SELECTION IN A COMMUNICATIONS NETWORK USING COMBINED VALUES OF METRICS OF DIFFERENT CHARACTERISTICS

BACKGROUND OF THE INVENTION

1. Field of the Invention

The present invention relates to a method for selecting routes in a communications network. This invention is particularly suitable for selecting routes in a wireless network formed by a plurality of wireless nodes.

2. Description of the Related Art

In a communications network where wireless cell-sites are interconnected by wireless links (i.e., radio beams) to form a wireless access network and the latter is connected to a wireline core network via optical links, each cell-site functions as a source/destination node for a mobile terminal or a transit node for repeating packets between neighbor cell-sites. Since communication within the access network is predominantly a flow of packets to and from the core network, packets from the access network follow the pattern of a tree, with a node on the core network serving as a root of the tree topology.

Two routing algorithms are available. One is the distance vector routing algorithm, the other being the link state routing algorithm. It is known that distance vector routing is suitable for a tree topology. Further, distance vector routing is preferred over link state routing because the former requires less routing information than the latter. In distance vector routing, a tree topology wireless network is built up by initially broadcasting a control packet from a core (root) node, containing its node identifier in its source address field and a metric field which is set to zero. An access node that receives it reads the source node identifier and updates the metric value by adding to it the cost of the route on its upstream side to the source node. If the hop count number is used as a measure of the route cost the metric is updated by adding the hop count "1" to the received metric value. If the transmission loss is used as a measure of the route cost, the access node calculates the transmission loss of the received RF signal from its field strength and sums the calculated value to the received metric value. The access node then stores the updated metric in its memory. Initially, there is only one metric value that is stored in the memory. Hence the source node is recognized as an upstream node. Then, the access node broadcasts a control packet containing the updated metric, with its source and destination address fields being set with its own identifier and the identifier of the upstream node, respectively. As the same process is repeated on neighbor access nodes, a sufficient amount of metric data is stored in their memory to select a least-cost route to the core node.

A wireless network configured in his way is characteristic of the metric used. If the hop count is used as a metric value, the network will be comprised of least-hop-count routes. If the transmission loss or signal-to-interference-noise ratio is used, the network will ensure high quality transmission. On the other hand, the use of hop counts will result in a network where the nodes are spaced at long distance apart. Hence, signals suffer distortion and interference. Further, the use of transmission loss and SINR as a metric will result in a network dominated by high number hop-count routes where signals experience long processing delays. Thus, the characteristic of a resulting network not only has the advantage of the metric used but also has its disadvantage.

SUMMARY OF THE INVENTION

It is therefore an object of the present invention to perform route selection for a network node for increasing the advantageous side of metrics by combining their metric values.

Another object of the present invention is to perform route selection for a network node by selecting a route to an upstream node of a tree topology having a minimum value of combined metrics.

A still further object of the present invention is to perform route selection for a wireless node by assigning a limited number of wireless links to high efficient routes to downstream nodes of a tree topology.

According to a first aspect of the present invention, there is provided a method of determining a route in a communications network. The method comprises the steps of transmitting control packets from a plurality of nodes via a plurality of routes to a local node and receiving, at the local node, control packets from a plurality of nodes. Each of the control packets contains first and second metric values of different transmission characteristics of a route on which the control packet is transmitted. At the local node, the first and second metric values of each of the received control packets are combined together to produce a plurality of combined metrics and at least one of the routes is selected according to the combined metrics.

The route selection is performed by detecting a minimum value of the combined metrics and selecting at least one of the routes having the detected minimum value. The combined metric is obtained by weighting the second metric and summing the weighted second metric with the first metric.

If the control packets are arriving from upstream nodes, the first and second metrics of each control packet may be updated and a minimum value of combined metrics is detected and a route having the minimum combined metric value is selected as the route to a core node.

If the control packets are arriving from downstream nodes, a plurality of smaller values of the combined metrics are detected in ascending order of their combined value corresponding in number to wireless links that can be established from the local node and routes of the detected smaller values are selected.

According to a further aspect, the present invention provides a method of determining a route in a wireless communications network, comprising the steps of (a) broadcasting control packets from a plurality of wireless nodes via a plurality of routes to a local wireless node, each of the control packets containing first and second metric values of different transmission characteristics of a corresponding one of the routes, (b) receiving, at the local node, control packets from the plurality of nodes, (c) determining whether the received control packets are received from upstream nodes or downstream nodes, (d) if the packets are received from upstream nodes, updating the first and second metrics of the received control packets and combining the first and second metrics of the received control packets to produce a plurality of combined metrics and selecting one of the routes according to the plurality of combined metrics, and (e) if the packets are received from downstream nodes, combining the first and second metrics of the received control packets to produce a plurality of combined metrics and determining smaller values of the combined metrics in ascending order of combined metrics corresponding in number to wireless links that can be established from the local wireless node and selecting routes having the detected smaller values from the plurality of routes.

According to a still further aspect, the present invention provides a network node for a communications network wherein the network node is one of a plurality of interconnected nodes of the network. The network node comprises an interface connected to the network, a metric table having a plurality of entries, and a routing control module. The routing control module broadcasts a control packet to the network via the interface, containing first and second metric values of different transmission characteristics of the route, receives control packets from a plurality of nodes via the interface. In the routing control module, the first and second metric values of the received control packets are stored in respective entries of the metric table, and the first and second metric values of each table entry are combined together to produce a plurality of combined metrics and at least one of the routes is selected according to the combined metrics.

BRIEF DESCRIPTION OF THE DRAWINGS

The present invention will be described in detail further with reference to the following drawings, in which.

DETAILED DESCRIPTION

Figure 1:
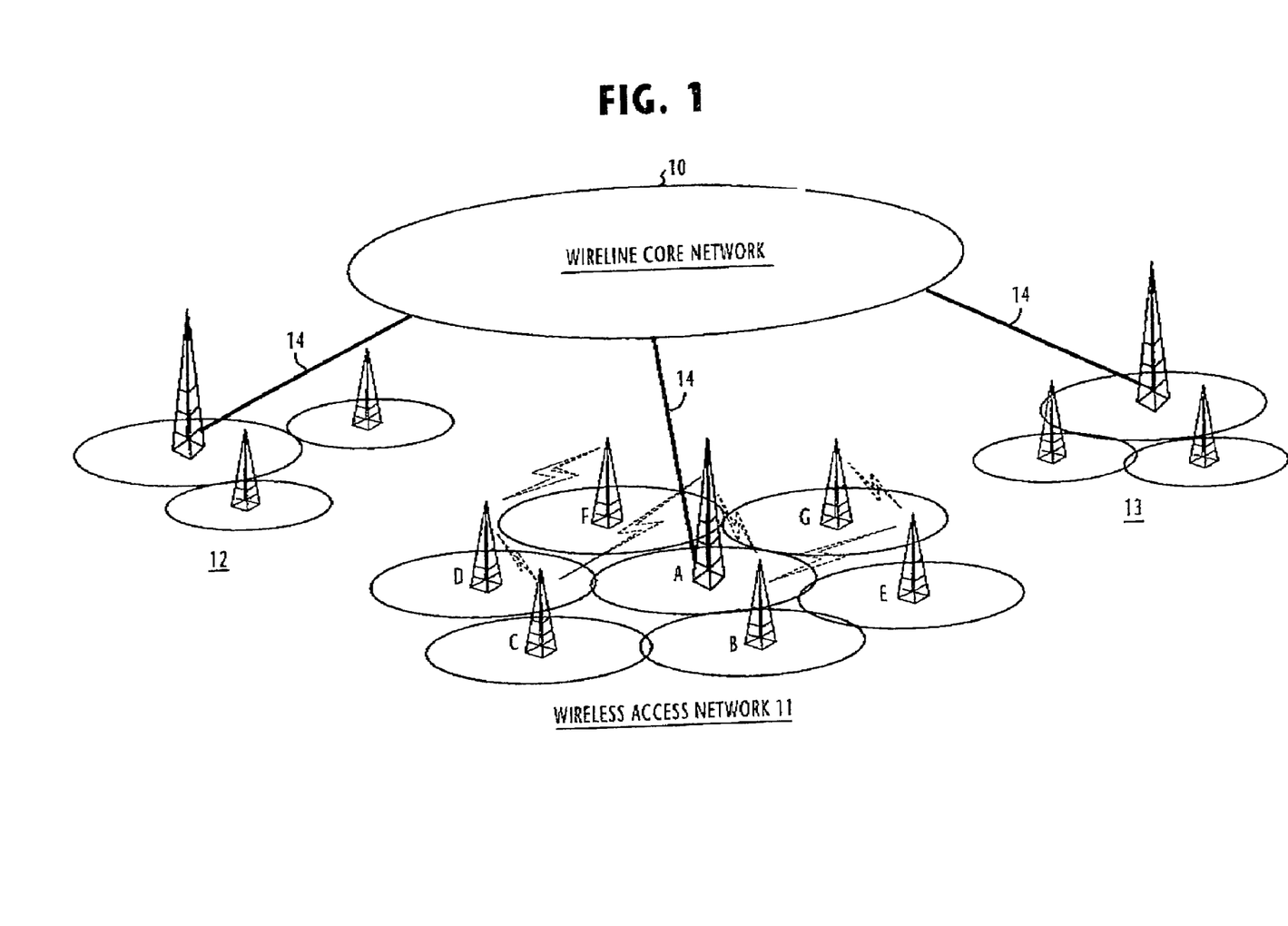
FIG. 1 is a block diagram of a communications network of the present invention illustrating a wireline core network and a number of wireless access networks connected to the core network.

Referring now to FIG. 1, there is shown a communications network. The network comprises a wireline core network 10 and a plurality of wireless access networks 11, 12, 13 connected to the core network 10 via respective wireline links 14 such as optical links. Each wireless access network is formed by a wireless core node and a plurality of wireless access nodes of the present invention. In the case of access network 11, the node A is the core node and is connected to the core network 10 via the optical link 14 and the nodes B through G are the access nodes. Within each access node, wireless links are established between the core node and the access nodes depending on their locations and usable directional antennas. In the illustrated example, the core node A has one of its antennas beamed to the access node B to which access nodes E and G are wirelessly connected in tandem. Core node A has its other antenna beamed to the access node C to which access nodes D and F are wirelessly connected in tandem.

Therefore, the core node A functions as a root node of a tree topology in which the access nodes B through G are connected. For each access node, there is an upstream node on its near side to the core node A and a downstream node on its far side from the core node.

Figure 2:
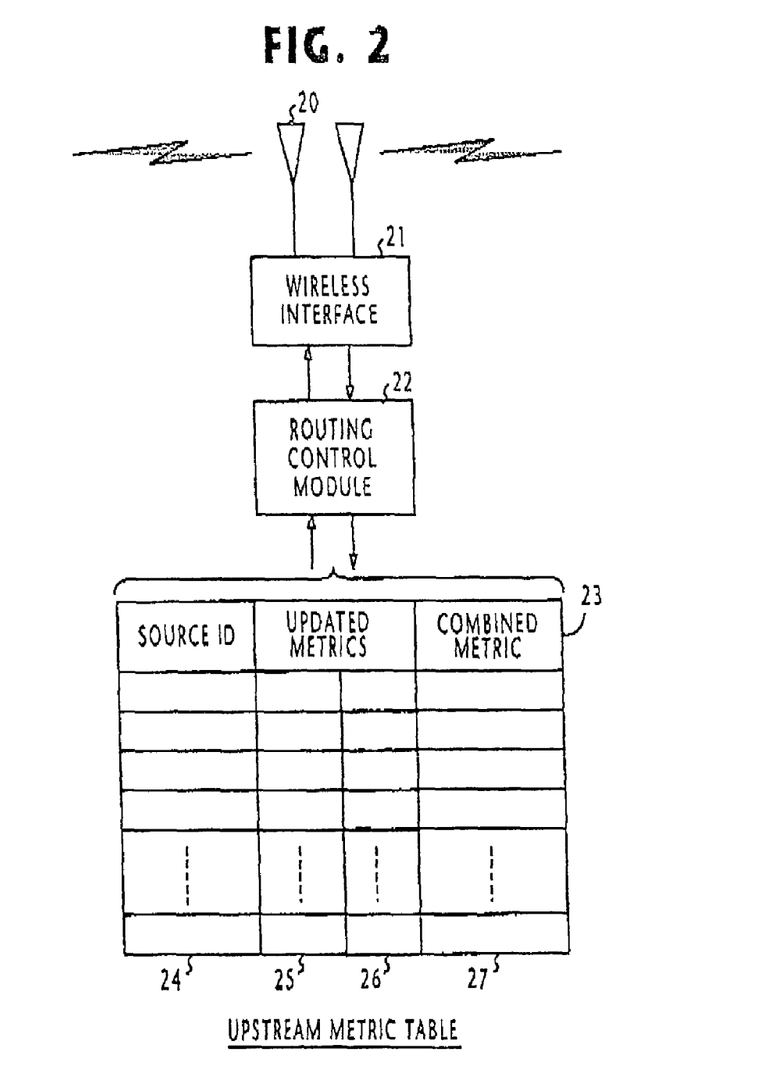
FIG. 2 is a block diagram of a wireless access node of FIG. 1 according to a first embodiment of the present invention.

The wireless access node of a first embodiment of this invention is shown in FIG. 2. The access node is comprised of a wireless interface 21 for operating with one or more directional antennas 20 to establish wireless links with neighbor nodes. A routing control module 22 is connected to the wireless interface 21 for broadcasting and receiving control packets to and from the neighbor nodes.

Figure 3:
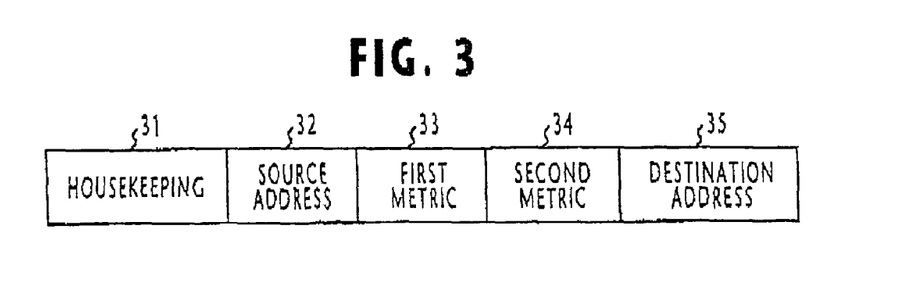
FIG. 3 is an illustration of the data format of a control packet of the present invention.

As shown in FIG. 3, the control packet has a housekeeping field 31 for setting data necessary for exchanging the control packet, a source address field 32 for setting a source node identifier, a first metric field 33 for setting a first metric value, a second metric field 34 for setting a second metric value, and a destination address field 35 for setting a destination node identifier.

Routing control module 22 is associated with an upstream metric table 23. Metric table 23 has a plurality of entries for source nodes located on the upstream side of the local access node. Each entry is used for setting a source node identifier in a source ID field 24, updated values of first and second metrics in updated metrics fields 25, 26 and a combined metric value in a combined metric field 27.

Figure 4:
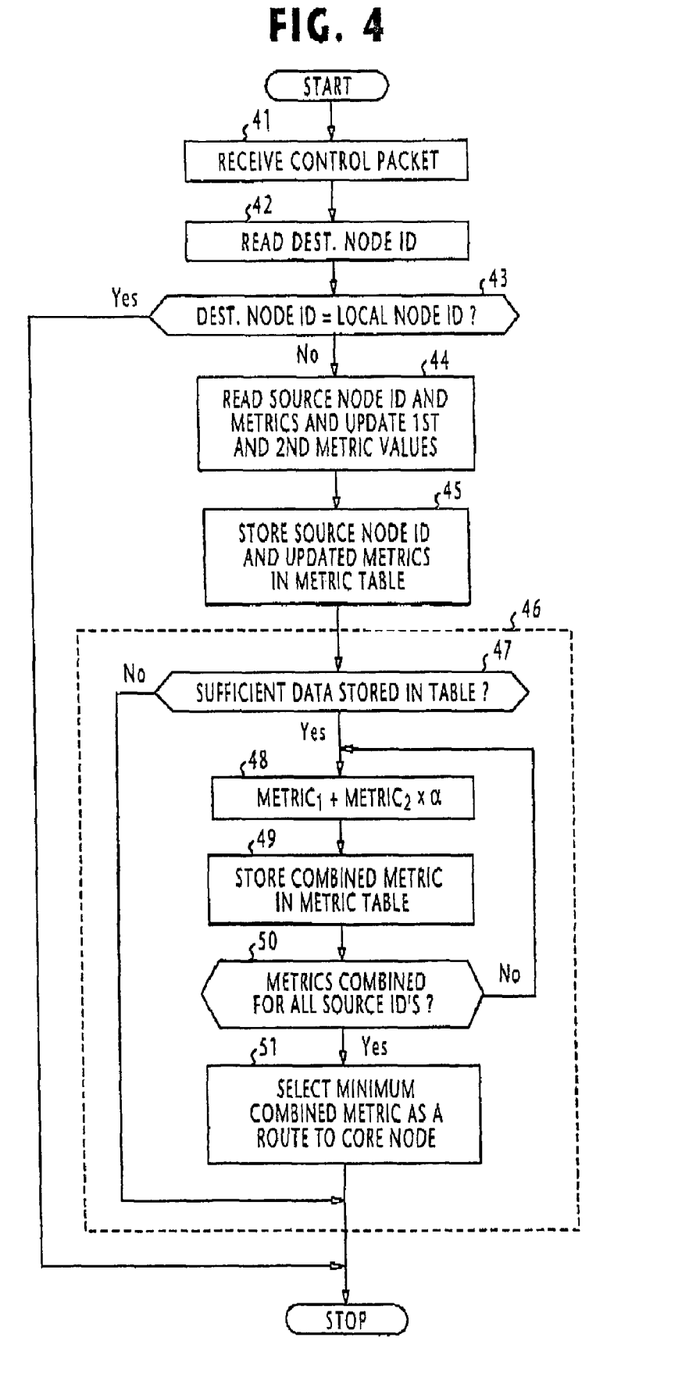
FIG. 4 is a flowchart of the operation of the wireless access node of the first embodiment of the present invention.

According to the flowchart of FIG. 4, the routing control module 22 operates by storing data into a vacant entry of the metric table 23 in response to receipt of a control packet from a neighbor node and selecting a route to an upstream node when sufficient data are stored in the metric table 23.

In FIG. 4, the operation of the routing control module 22 begins with step 41 when a control packet is received from the network. At step 42, the routing control module reads the destination node ID, and determines whether the destination node ID is equal to the node ID of the local node. If this is the case, the local node is targeted by the source node as an upstream node. Hence, the routing control module terminates the routine, recognizing that the source node is no longer a candidate upstream node of the local node.

If the decision at step 43 is negative, the routing control module determines that the source node can possibly be a candidate upstream node of the local node and proceeds to step 44 to read the source node ID and the first and second metrics from the packet and update the first and second metric values individually. Metrics that can be employed include hop count number, transmission loss and reciprocal of SINR. Assume that the first metric is the transmission loss and the second metric is the hop count number. If the first and second metrics of the control packet are 35.0 dB and 2 hops, respectively, and the transmission loss of the route from the source node to the local node is 30.0 dB, then the first and second metric values are updated to 36.2 dB and 3 hops, respectively. At step 45, the routing control module stores the source node ID and the updated values of the first and second metrics into a vacant entry of the upstream metric table 23.

Route selection subroutine 46 is then performed, which begins with decision step 47 to determine whether sufficient data are stored in the upstream metric table 23 to make a determination on a route to a core node. The determination may be based on the time lapse from the instant a first control packet is received or the number of control packets received from a candidate upstream node.

If the decision at step 47 is affirmative, flow proceeds to step 48 to read the first and second metric values from the first entry of the upstream metric table 23 and calculate a combined metric for the upstream source node according to the following equation:

$$\text{Combined metric} = \text{first metric} + \text{second metric} \times \alpha$$

where $\alpha$ is a coefficient.

The combined metric value of the upstream node is then stored in the combined metric field 27 of the current entry from which the two metric values have been retrieved. Steps 48 and 49 are repeated by successively shifting the read address point from one entry to the next until combined metric values are calculated for all source node identifiers (step 50). When the decision at step 50 is affirmative, flow proceeds to step 51 to read all data stored in the combined metric field 27 of the upstream metric table. From the combined metric data, the routing control module 22 selects a minimum combined metric value as the route to a core (root) node.

If the first metric of a route A is 40.0 dB, the second metric of the route is 2 hops and the coefficient α is equal to 20.0 dB, the calculation yields a combined metric value of 43.0 dB. If there is a route B whose first metric is 42.0 dB and the second metric is one hop with the same coefficient (α=20.0 dB) as that of the previous example of route A, the combined metric is 42.0 dB. Since the route B has a smaller value of combined metric than the combined metric value of route A, the route B will be selected at step 51.

In the above example, the second metric and the coefficient are multiplied on the logarithmic scale and the multiplied value is summed with the first metric on the normal scale. If the second metric and the coefficient are multiplied on the normal scale and the multiplied value is summed with the first metric on the logarithmic scale, the combined metric value equals 63.0 dB.

By combining different metric values as a measure of route selection, the advantageous characteristics of both metrics are integrated in a single network.

Figure 5:
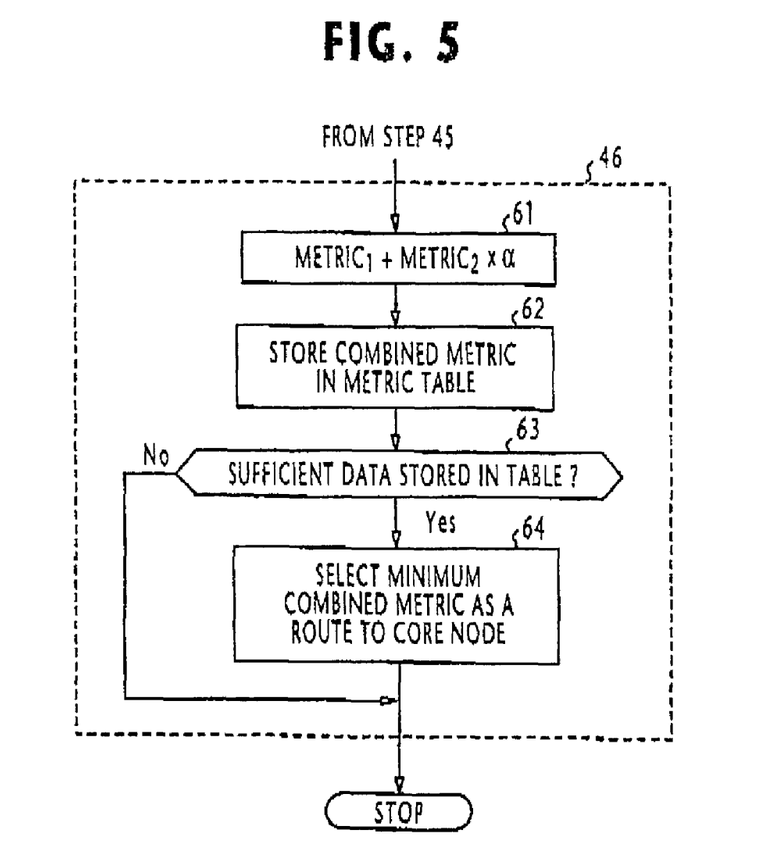
FIG. 5 is a flowchart of an alternative form of route selection subroutine of FIG. 4.

As shown in FIG. 5, route selection subroutine 46 may alternatively begin with calculation step 61 to produce a combined metric, which is stored in the upstream metric table (step 62). Metric table 23 is then checked at step 63 to see if sufficient data has been stored to make a route selection. If this is the case, step 64 is executed to select a minimum combined metric as a route to the core node.

Figure 6:
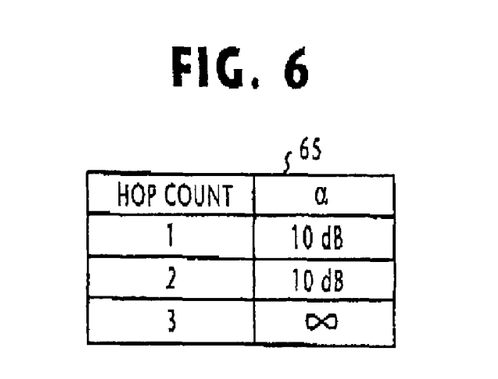
FIG. 6 is an illustration of a conversion table.

The coefficient α may be varied with hop count numbers as indicated in a conversion table 65 shown in FIG. 6. In an example, the coefficient α is 10 dB for hop counts of 1 and 2 and jumps to infinity when the hop count is 3. Consider a route C where the first metric is assumed to be 35.0 dB identical to that of the control packet described with respect to step 44 and the coefficient α is 10 dB for a hop count smaller than 3, the combined metric is calculated as being equal to 36.2 dB. Assume that the first and second metrics of route A are 40.0 dB and 2 hops, respectively, identical to those used in the previous example, the combined metric of route A is equal to 40.0 dB (i.e., 40 dB+2×10 dB that is converted to a normal value 10000+100=10100 that is reconverted to 10×log (10100)=40 dB). In this case, the route C has a smaller combined metric value than that of the route A (i.e., 40.0 dB), the former is selected as a route to the core node. If the route C has a hop count equal to 3, the coefficient α is of infinite value and the route A is selected. The use of such a variable coefficient is beneficial for applications where network performance degrades seriously when the second metric (i.e., hop count number) exceeds some critical value.

If the number of downstream nodes located within the transmission range of a local node is greater than the number of wireless links that can be established, it is necessary to use some decision algorithm to limit the number of nodes that can be selected as downstream nodes to the number of such wireless links (i.e., the number of usable antennas). If a local node has three wireless links that can be established with its antennas, for example, one of the links is use for an upstream node, leaving only two links for downstream nodes.

Figure 7:
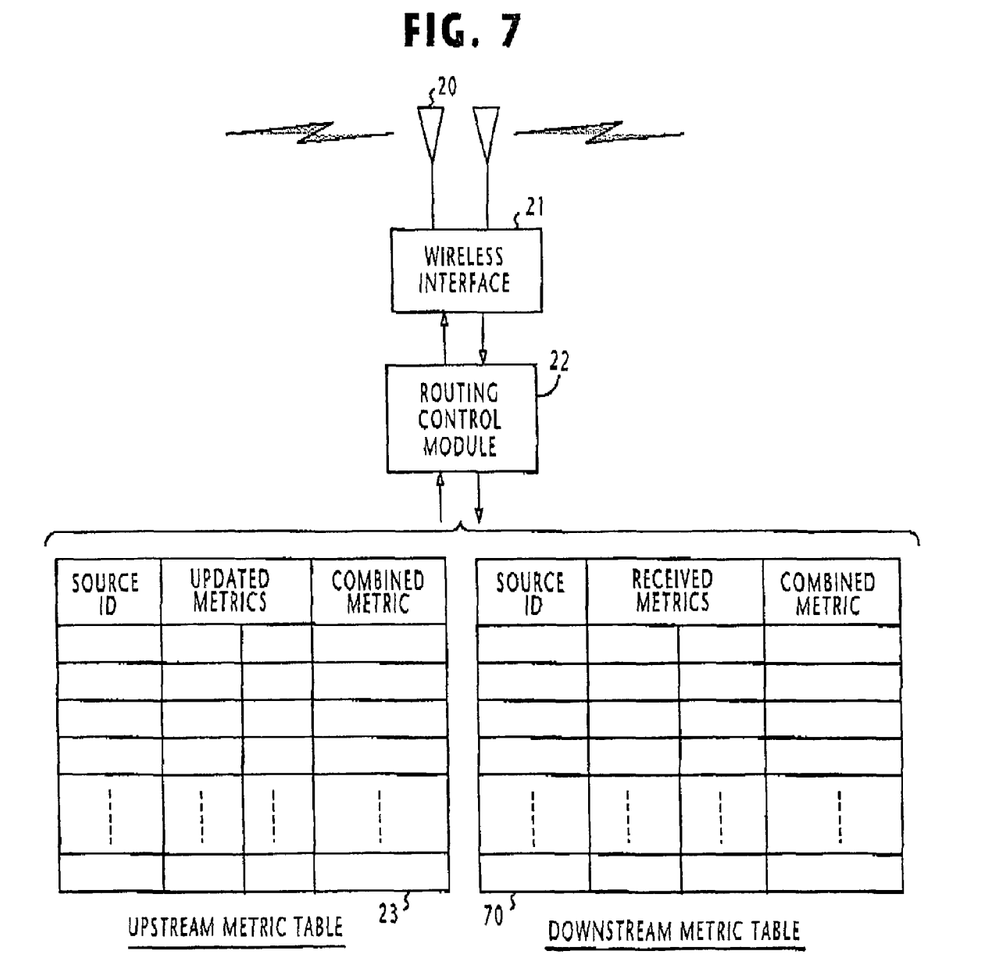
FIG. 7 is a block diagram of a wireless access node of FIG. 1 according to a second embodiment of the present invention.

The use of combined metrics discussed above can be advantageously applied to the selection of downstream nodes. A second embodiment of the present invention, shown in FIG. 7, illustrates a decision algorithm of the routing control module 23 for selecting downstream nodes. In FIG. 7, the second embodiment differs from the previous embodiment by the inclusion of a downstream metric table 70 identical to the upstream metric table 23.

Figure 8:
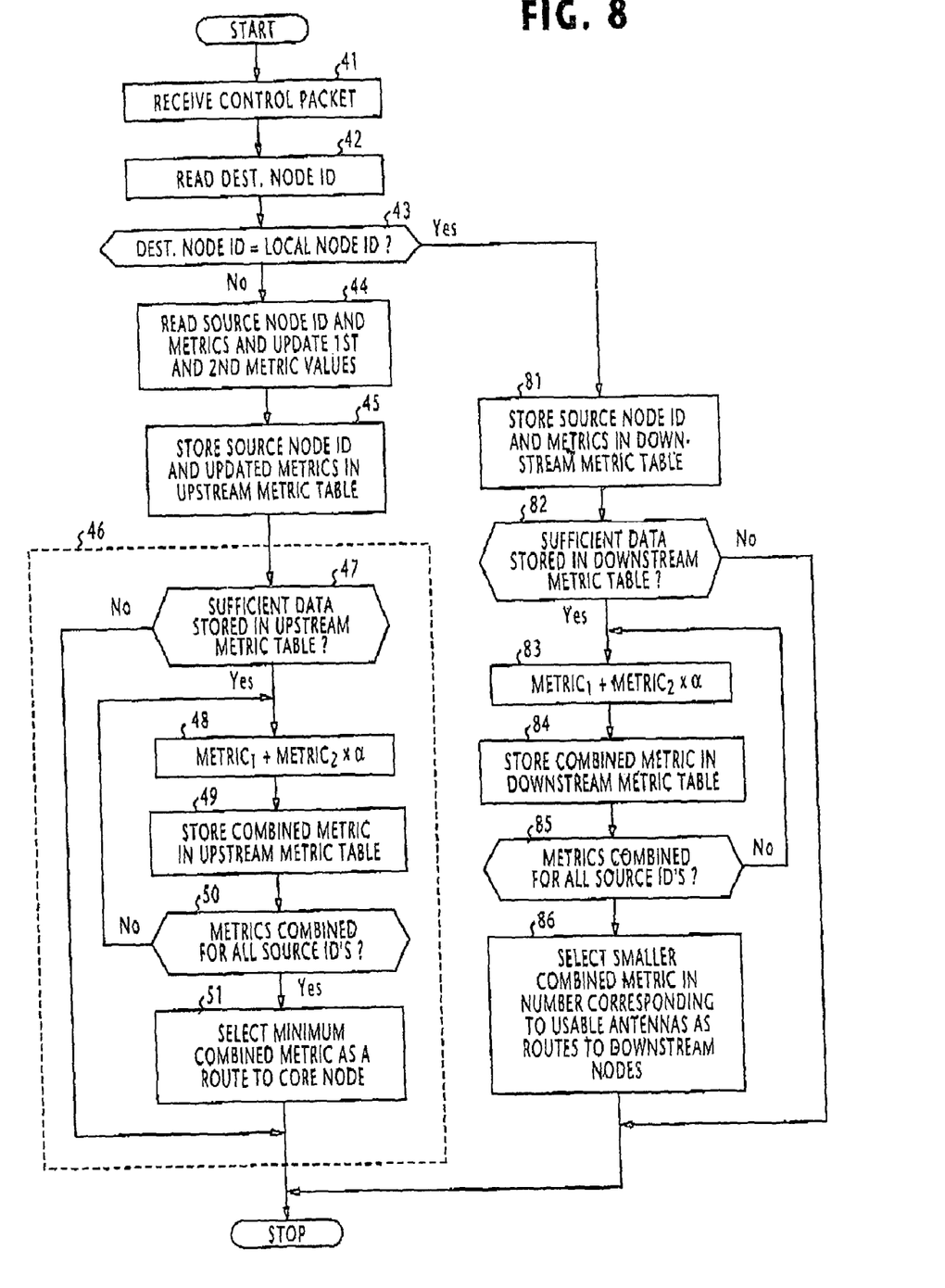
FIG. 8 is a flowchart of the operation of the wireless access node of the second embodiment of the present invention.

The operation of the routing control module 23 of FIG. 7 proceeds according to the flowchart of FIG. 8, in which parts corresponding to those of FIG. 4 are marked with the same numerals and the description thereof is omitted.

When the received destination node ID is equal to the identifier of the local node, the routing control module determines that the source node may possibly be a downstream node of the local node. In this case, the routing control module proceeds from step 43 to step 81 to store the source node ID and the two metric values of the received control packet into a vacant entry of the downstream metric table 70. If not sufficient data is stored in the metric table 70, the routine is terminated (step 82). Otherwise, flow proceeds from step 82 to step 83 to read the first and second metric values from the first entry of the downstream metric table 70 and calculate a combined values of these two metric values in the same manner as described above.

The calculated combined metric is then stored in the current entry of the downstream metric table from which the metric values have been retried (step 84). Steps 83 and 84 are repeated by successively shifting the read address point from one entry to the next until combined metric values are calculated for all source node identifiers of table 70 (step 85). When the decision at step 85 is affirmative, flow proceeds to step 86 to read all data stored in the combined metric field of the downstream metric table 70. Smaller combined metric values are selected from the read data corresponding in number to usable antennas of the local node as routes to downstream nodes.

It is seen that the use of combined metrics for selecting downstream nodes with a limited number of usable antennas allows higher efficient routes to be selected with priority over lower efficient routes.

What is claimed is:

1. A method of determining a route in a communications network, comprising the steps of:
   a) broadcasting control packets from a plurality of nodes via a plurality of routes to a local node, each of said control packets containing a first metric value of a first category and a second metric value of a second category, said first and second categories respectively representing transmission quality and hop count of a corresponding one of said routes;
   b) receiving, at said local node, control packets from said plurality of nodes; and
   c) multiplying the second metric value of each of the received control packets by a coefficient of said first category and summing the first metric value and the multiplied second metric value of each of the received control packets to produce a plurality of summed metric values corresponding in number to said plurality of routes and selecting at least one of said routes according to said plurality of summed metric values,
   wherein the first metric value and the second metric value have different units of measurement.

2. The method of claim 1, wherein the step (c) comprises detecting a minimum value of said summed metric values and selecting one of said routes having the detected minimum value when said control packets are received from upstream nodes.

3. The method of claim 2, wherein the step (b) further comprises updating the first and second metric values of each of said received control packets.

4. The method of claim 1, wherein said coefficient is variable with the second metric value.

5. The method of claim 1, wherein said coefficient is infinity when said hop count number exceeds a predetermined value.

6. The method of claim 1, wherein each of said nodes is a wireless node, further comprising the steps of detecting a plurality of smaller values of said summed metric values corresponding in number to wireless links that can be established from said local node and selecting routes having the detected smaller values from said plurality of routes when said control packets are received from downstream nodes.

7. The method of claim 6, wherein said plurality of nodes are located on downstream side of said local node.

8. The method of claim 1, wherein said plurality of nodes are located on upstream side of said local node.

9. The method of claim 1, wherein the step (c) comprises the steps of:
   A) storing the first and second metric values of each control packet in an entry of a memory;
   B) determining whether a sufficient amount of metric values are stored in said memory; and
   C) if a sufficient amount of metric values are stored in said memory, performing step (c).

10. A method of determining a route in a wireless communications network, comprising the steps of:
   a) broadcasting control packets from a plurality of wireless nodes via a plurality of routes to a local wireless node, each of said control packets containing a first metric value of a first category and a second metric value of a second category, said first and second categories respectively representing transmission quality and hop count of a corresponding one of said routes;
   b) receiving, at said local node, control packets from said plurality of nodes;
   c) determining whether the received control packets are received from upstream nodes or downstream nodes;
   d) if the control packets are received from upstream nodes, updating the first and second metric values of the received control packets and multiplying the second metric value of each of the received control packets by a coefficient of said first category and summing the first metric value and the multiplied second metric value of each of the received control packets to produce a plurality of summed metric values and selecting one of said routes according to said plurality of summed metric values; and
   e) if the control packets are received from downstream nodes, multiplying the second metric value of each of the received control packets with a coefficient of said first category and summing the first metric value with the multiplied second metric value of said each control packet to produce a plurality of summed metric values and determining smaller values of the summed metric values corresponding in number to wireless links that can be established from said local wireless node and selecting routes having the detected smaller values of the summed metric values from said plurality of routes,
   wherein the first metric value and the second metric value have different units of measurement.

11. A network node for a communications network wherein said network node is one of a plurality of interconnected nodes of said network, comprising:
   an interface connected to the network;
   a metric table having a plurality of entries; and
   routing control means for broadcasting a control packet to said network via said interface, said control packet containing a first metric value of a first category and a second metric value of a second category, said first and second categories respectively representing transmission quality and hop count of one of a plurality of routes from said network node, receiving said control packets from said plurality of nodes via said interface, storing the first and second metric values of each of the received control packets in respective entries of said metric table, multiplying, in each of said entries, the second metric value with a coefficient of said first category and summing the first metric value and the multiplied second metric value to produce a plurality of summed metric values and selecting at least one of said routes according to said plurality of summed metric values,
   wherein the first metric value and the second metric value have different units of measurement.

12. The network node of claim 11, wherein said routing control means detects a minimum value of said summed metric values and selects one of said routes having the detected minimum value.

13. The network node of claim 12, wherein the routing control means updates the first and second metric values of each of said received control packets before multiplying said second metric value and summing the updated first metric value with the multiplied updated second metric value to produce said plurality of summed metric values.

14. The network node of claim 11, wherein said coefficient is variable with the second metric value.

15. The network node of claim 11, wherein said coefficient is infinity when said hop count number exceeds a predetermined value.

16. The network node of claim 11, wherein said interface is a wireless interface and wherein said routing control means further detects a plurality of smaller values of said summed metric values corresponding in number to wireless links that can be established from said wireless interface and select routes having the detected smaller values from said plurality of routes.

17. The network node of claim 16, wherein said plurality of nodes from which said control packets are received are located on downstream side of said network node.

18. The network node of claim 11, wherein said plurality of nodes from which said control packets are received are located on upstream side of said network node.

* * * * *